Oct. 30, 1928.　　　　　　　　　　　　　　1,689,924
E. J. MALONEY
STEERING MECHANISM
Original Filed May 24, 1923　　2 Sheets-Sheet 2
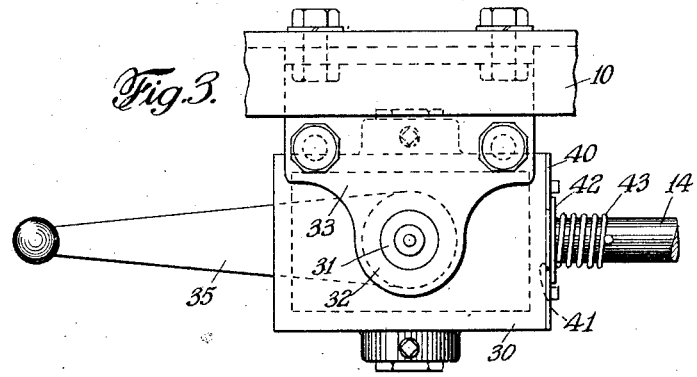
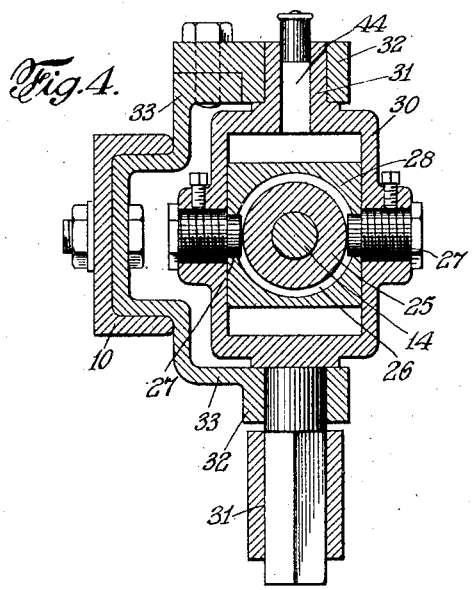
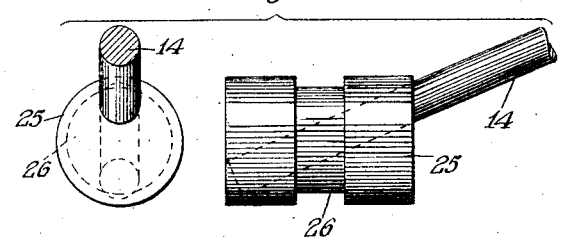
Inventor
Edward J. Maloney
By his Attorney Patented Oct. 30, 1928.

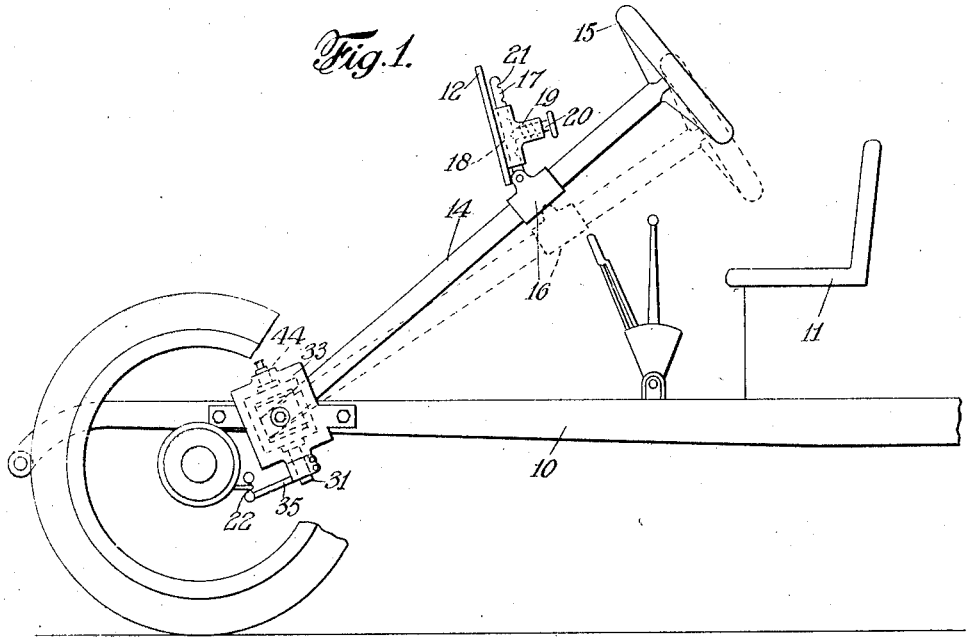

1,689,924

UNITED STATES PATENT OFFICE.

EDWARD J. MALONEY, OF LONG ISLAND CITY, NEW YORK.

STEERING MECHANISM.

Application filed May 24, 1923, Serial No. 641,042. Renewed May 1, 1928.

The invention relates to steering mechanism for use in vehicles, especially self-propelled vehicles. As at present constructed, such steering mechanism comprises among other elements a steering post which is fixed relatively to the body of the vehicle, as an automobile, and is provided at one end with the steering wheel thru the turning of which the vehicle is steered, as desired. In many instances, this fixed position of the steering post and wheel makes it extremely awkward for the driver; and with some makes of cars it becomes practically impossible for a stout person to operate same.

The present invention has for its object steering mechanism of simple and rugged construction and whereby the position of the steering post may be adjusted to suit, as in swinging same away or toward the driver. The invention has for a further object simple mechanism for transmitting the rotation of the steering post to the immediate steering element as, for example, the drag link of an automobile, the arrangement being such that road shocks cannot be transmitted to the steering wheel and thus relieving the driver of fatigue and danger of having the wheel wrenched from his grip. The construction, furthermore, insures ample bearing surface, obviating lost motion; and the design, moreover, admits of the moving parts being enclosed within a grease filled box so that the same are practically indestructible.

The nature of the invention, however, will best be understood when described in connection with the accompanying drawings, in which—

Fig. 1 is a view illustrating the improved steering mechanism mounted on a chassis or frame of a vehicle.

Figs. 2 and 3 are respectively a side and plan view of the steering mechanism.

Fig. 4 is a longitudinal section taken on the line 4—4, Fig. 2, looking in the direction of the arrows.

Fig. 5 is a detail view of the double eccentric member employed.

Similar characters of reference designate corresponding parts thruout the several views.

Referring to the drawings, 10 designates a chassis, for example, of an automobile, 11 the seat for the driver and 12 the dash board located in front of the seat. A steering post 14, which may be in the form of a rod or tube, is provided in the usual manner between the dash board and seat and carries at its one end a steering wheel 15 by which the vehicle is to be steered in turning same. A bearing 16 is provided at the upper end of the post 14 for rotatably mounting the latter; and this bearing is swivelled to a slide member 17 arranged to be adjusted and held in guide-ways 18 of a bracket member 19, secured, for example, to the dash board 12. The slide 17 is secured to the bracket as by means of a spring-urged plunger 20 of the bracket fitting recesses 21 of the slide so that the bearing 16 may be locked in different angular positions in a vertical plane. As hereinafter more fully set forth, the steering post 14 is arranged to allow of its swinging with the bearing 14 in a vertical plane as indicated by the position shown in dotted lines, Fig. 1; and the operator of the vehicle may thereby accommodate the steering wheel to suit his sitting position by correspondingly adjusting the slide 17 in the bracket 19.

To enable the steering post to undergo such swinging movement, its opposite end is arranged to be pivotally mounted with respect to the chassis 10 while at the same time allowing for the transmission of its rotational movement to the immediate steering element, as the drag link 22 of an automobile. This is accomplished by securing about the lower end of the steering post, or forming integrally therewith, a double acting eccentric member 25, for example, in the nature of a cylinder whose longitudinal axis is at an angle to the longitudinal axis of the steering post 14, both axes lying in the same plane. This will provide for a double eccentric member with opposed surfaces, the relative positions of the post and cylinder and the angle between the respective axes being so chosen that the opposed surfaces are substantially equal in their effect and work in opposite directions to provide a couple when the steering post is rotated. The member 25 is, moreover, provided mid-way of its ends with a peripheral groove 26 into which fit diametrically opposed studs 27 which provide pivots for allowing the oscillation in a vertical plane of the steering post, and which permit at the same time of rotational movement of the member 25 thru the rotational movement imparted thereto by the steering post in the operation of steering the vehicle.

Surrounding the cylinder 25 is a sleeve or block 28 which is held thereto against relative axial movement by the said studs 27 which also pass therethru; and rotary movement of the cylinder with respect to this sleeve will therefore cause movement of the latter in the direction of least resistance. This movement is exerted against the walls of a box bearing 30 carrying the studs 27, and having trunnions 31, which fit corresponding bearings 32 of a bracket 33 secured in any suitable manner to the chassis 10. To one of the trunnions is secured an arm 35 to receive and transmit the rotational movement thereof to the drag link 22, the bracket 33 being secured to the chassis at the angle most suitable for the transmission of the movement.

In this manner, the rotational steering movement given the wheel 15 by the driver is transmitted to the drag link 22, but allows also for an adjustment of the said steering wheel relatively to the driver, the raising or lowering of the post 14 being compensated for by the swivelled connection between bearing 16 and the slide member 17. Box bearing 30, moreover, is made sufficiently large to allow the sleeve to oscillate about the studs 27, to accommodate the motion imparted to it by the member 25, as well as any other motion which may be imparted to it thru the movement in a vertical plane of the steering post with wheel. It will be appreciated that while the movement of the latter at the wheel end may be some 8 to 10 inches, the actual movement of the member 25 will be very slight and does not in any manner affect the rotary action of the said member or the oscillating movement of the box bearing.

The said box bearing, moreover, is provided at one side with an opening to allow of the insertion of the member 25 and its sleeve, said opening being arranged to be closed by a suitable cover member 40 having an opening 41 sufficiently large to allow the steering post to pass therethru and accommodate its movement. This opening is arranged, moreover, to be closed by a cover washer 42 mounted about the post and held in contact with the box cover 40 by means of a spring 43, also mounted about the steering post.

Suitable grease for lubricating the movable member may be introduced to the box thru an opening 44 provided thru one of the trunnions 31. It will be noted that all of the movable members are of ample proportions with large bearing surface so that wear and lost motion resulting therefrom are obviated.

I claim:—

1. Steering gear for vehicles, comprising a swingable steering post with wheel at one end, a cylinder about the other end of the steering post with its longitudinal axis at an angle to the axis of the post and provided with a transverse peripheral groove intermediate its ends, studs fitting therein to permit the cylinder to oscillate about same in a vertical plane in swinging the steering post as well as to be rotated about its own longitudinal axis upon turning the steering post, the drag link of the vehicle, means connecting the cylinder with said drag link, including a block about and contacting with said cylinder and in which the cylinder may turn, said studs passing thru the block into the groove of the cylinder, a box bearing for said block, carrying said studs and having trunnions, a bracket providing suitable bearings for said trunnions and secured to the frame of the vehicle, and an arm movable with said trunnions and connected with the drag link.

2. In a vehicle: a swinging steering post; means to lock same to a fixed portion of the vehicle; the drag link of the vehicle; a double eccentric member mounted at the lower end of the steering post; and a cooperating member acted upon thereby in opposite directions upon turning the said steering post to provide a couple for rotating the cooperating member; and means connecting the drag link with said cooperating member.

Signed at New York, in the county of New York and State of New York this 22nd day of May, A. D. 1923.

EDWARD J. MALONEY.